United States Patent [19]

Boldt et al.

[11] Patent Number: 4,692,505

[45] Date of Patent: Sep. 8, 1987

[54] PROCESS FOR PREPARING OXYMETHYLENE POLYMERS USING BORON TRIFLUORIDE IN ADMIXTURE WITH AN INERT GAS

[75] Inventors: Clifford R. Boldt, Corpus Christi, Tex.; Richard K. Greene, Kenet Square, Pa.

[73] Assignee: Celanese Engineering Resins, Inc., Chatham, N.J.

[21] Appl. No.: 888,809

[22] Filed: Jul. 22, 1986

[51] Int. Cl.$^4$ ................................................ C08G 2/10
[52] U.S. Cl. .................................... 528/241; 528/240; 528/243; 528/270
[58] Field of Search ................ 528/240, 241, 243, 270

[56] References Cited

U.S. PATENT DOCUMENTS

| | | | |
|---|---|---|---|
| 2,989,506 | 10/1957 | Hudgin | 260/67 |
| 2,989,507 | 10/1957 | Hudgin | 260/67 |
| 3,027,352 | 2/1958 | Walling | 260/67 |
| 4,105,637 | 10/1974 | Semanchik | 528/241 |
| 4,115,369 | 11/1977 | Sugio | 526/65 |
| 4,224,435 | 6/1979 | Sugio | 528/232 |
| 4,301,273 | 5/1980 | Sugio | 528/230 |
| 4,339,569 | 7/1982 | Sugio et al. | 528/240 |
| 4,342,680 | 3/1980 | Sugio | 524/100 |
| 4,436,900 | 3/1984 | Matsuzaki et al. | 528/490 |
| 4,446,263 | 12/1982 | Bryant | 524/100 |
| 4,458,064 | 8/1983 | Chatterjee | 528/501 |
| 4,469,842 | 8/1983 | Kritchevsky | 524/593 |
| 4,480,071 | 9/1983 | Natarajan | 524/593 |

*Primary Examiner*—Lucille M. Phynes
*Attorney, Agent, or Firm*—Herbert P. Price

[57] ABSTRACT

Oxymethylene polymers are prepared by the continuous polymerization of trioxane using as a catalyst a blend of boron trifluoride gas and nitrogen gas. Oxymethylene polymers are used in the manufacture of plumbing fixtures, pipes, automobile body parts and a variety of other articles.

10 Claims, No Drawings

PROCESS FOR PREPARING OXYMETHYLENE POLYMERS USING BORON TRIFLUORIDE IN ADMIXTURE WITH AN INERT GAS

BACKGROUND OF INVENTION

The field of art to which this invention pertains is oxymethylene polymers.

Oxymethylene polymers which have recurring —$CH_2O$— units have been known for many years. They are prepared by the polymerization of formaldehyde or trioxane which is a cyclic trimer of formaldehyde. Oxymethylene polymers vary in molecular weight depending on the method of preparation.

High molecular weight solid oxymethylene polymers have been prepared by polymerizing trioxane in the presence of certain fluoride catalysts, such as boron trifluoride coordination complexes with organic compounds as described in U.S. Pat. No. 2,989,506. The use of boron trifluoride in its gaseous form is described in U.S. Pat. No. 2,989,507. Oxymethylene copolymers containing repeating carbon-to-carbon single bonds in the polymer chain are prepared by copolymerizing trioxane and any of various cyclic ethers, such as ethylene oxide or dioxolane as disclosed in U.S. Pat. No. 3,027,352. Such copolymers contain from about 85 to about 99.6 mole percent of oxymethylene units interspersed with between about 0.4 and 15 mole percent of —O—R— units wherein R is a divalent radical containing at least 2 carbon atoms directly linked to each other and positioned in the chain between the two valences with any substituents on the R radical being inert.

Other methods of preparing oxymethylene polymer are disclosed by Kern et. al. in Angewandte Chemie 73 pp. 177–186, (Mar. 21, 1961) including polymers containing repeating carbon-to-carbon single bonds in the polymer chain by copolymerizing trioxane with cyclic ethers, such as dioxane, lactones, such as beta-propiolactone, anhydrides, such as cyclic adipic anhydride and ethylenically unsaturated compounds, such as styrene, vinyl acetate, vinyl methyl ketone, acrolein and the like.

Continuous processes for preparing oxymethylene polymers are described in U.S. Pat. Nos. 4,105,637, 4,115,369, 4,224,435 and 4,431,794.

SUMMARY OF INVENTION

This invention pertains to oxymethylene polymers. In one aspect, this invention relates to the continuous polymerization of trioxane. In another aspect, this invention pertains to the efficient use of gaseous boron trifluoride as a catalyst for the polymerization of trioxane to polyoxymethylene.

By the process of this invention, oxymethylene polymers are produced by continuously polymerizing a monomer mixture, containing at least about 85 weight percent trioxane, in bulk by introducing into the reactor containing the monomer mixture a boron trifluoride catalyst as a gas in admixture with gaseous nitrogen, wherein the volume ratio of the nitrogen to boron trifluoride is about 5:1 to about 40:1.

The boron trifluoride catalyst is added to the reactor in the amount of about 20 to about 200 parts per million (ppm), based on the total weight of the polymerizable monomers. The increased volatility and pressure drop at which the boron trifluoride/nitrogen gas mixture discharges into the reactor increases the mixing energy available to distribute the catalyst more evenly into the reaction mixture. This more even distribution results in less encapsulation of catalyst which can result from polymers formed in high catalyst concentration regions, more polymerization reaction sites, higher conversions and more uniform polymer product from the reactor.

DETAILED DESCRIPTION OF INVENTION

The process of this invention is used for the homopolymerization and copolymerization of trioxane. Suitable monomers which can be used with trioxane in the copolymerization reaction are cyclic ethers and cyclic acetals having 2 or more adjacent carbon atoms and, in particular, from 3 to 9 ring members. Examples of such monomers are ethylene oxide, 1,2-propylene oxide, trimethylene oxide, butadiene oxide, 1,3-dioxolane, 1,4-butane diol formal, diethylene glycol formal, o-xylene glycol formal, thiodiglycol formal and 1,3-oxythiolane. These monomers are copolymerized with trioxane in the amounts of about 0.1 to 15 weight percent and, preferably, from about 0.5 to about 5 weight percent based on the total weight of monomers. The molecular weight of the polymers can be controlled by means of regulators conventionally employed in trioxane polymerization reactions. Suitable regulators are acetals or formals of monohydric alcohols, the alcohols themselves, or small amounts of water. The preferred regulator is methylal. The regulators are used in the amount of about 10 to about 1000 ppm and, preferably, from about 100 to about 500 ppm based on the total weight of monomers.

The catalyst used in this invention is boron trifluoride gas which is mixed with nitrogen gas before being introduced into the reactor containing the monomers. The boron trifluoride gas is used in the amount of about 20 to about 200 ppm and, preferably, about 40 to about 120 ppm based on the weight of monomer. The boron trifluoride gas is blended with nitrogen gas in the volume ratios of about 1:5 to about 1:40 boron trifluoride to nitrogen and preferably about 1:10 to about 1:30 parts.

The monomers and regulators if used can be premixed and then introduced into the polymerization reactor or may be introduced separately. The trioxane is introduced in molten form. The polymerization reactor can be an extruder, a kneader, a stirred kettle, a gear pump, or a flow tube with or without a static mixing element. It should be possible to heat or cool the reactor and also to impose a temperature profile on it. The reaction can be conducted isothermally or adiabatically since the relatively low enthalpy of polymerization does not give rise to any problems with regard to the supply and removal of heat. Suitable reactors are described in U.S. Pat. Nos. 2,505,125, 3,630,689, 4,105,637 and 4,115,369 which are hereby incorporated by reference.

In accordance with this invention, the trioxane in molten form is introduced into the reactor along with comonomers and chain regulators if used. The boron trifluoride gas is blended with nitrogen gas before being introduced into the reactor. The gaseous mixture is then added through a small jet or pin opening under such pressure that the gas blend is injected into the monomer mixture. The jet or pin openings will vary from about 0.01 to about 0.2 inch in diameter and preferably from about 0.05 to about 0.1 inch. The gaseous catalyst mixture is added to the reactor under a pressure, measured as back pressure, of at least 10 psi.

The polymerization reaction is carried out at a temperature above the melting point of the trioxane and under the boiling point of the trioxane. The temperature will vary from about 160° F. to about 230° F. and, preferably, will vary from about 200° F. to 220° F.

The reaction is conducted in the reactor for a time sufficient to obtain a conversion of monomer to polymer of about 40 to about 70 weight percent and, preferably, about 50 to about 60 weight percent. The residence time in the reactor will vary from about 1 minute to about 20 minutes and, preferably, from about 2 minutes to about 10 minutes. When the extent of polymerization is completed, the reactor contents are ground to a mean particle size of about 0.5 to about 1.5 millimeters. The polymerization reaction is then stopped by introducing the grind into a quench tank which contains water and a base, e.g., triethylamine. The unreacted trioxane is then recovered for recycle and the polymer is stabilized by removal of end groups using well known stabilization procedures such as those described in U.S. Pat. Nos. 4,087,411, 4,301,273 and 4,342,680 which are hereby incorporated by reference.

By the use of this invention, the efficiency of the catalyst is improved, the conversion of monomers to polymer is increased and the amount of catalyst can be reduced. The amount of catalyst can be reduced to as much as 50 percent while still obtaining conversions equivalent to those obtain using up to twice as much boron trifluoride without nitrogen. The polymeric product obtained by this process shows improvements in extractable formaldehyde, color and $K_d$ values which values are a measure of the degradation rate of the composition when molded, i.e., the average weight loss per minute at 230° C.

The following examples describe the invention in more detail. Parts and percentages are parts and percentages by weight unless otherwise designated.

EXAMPLE 1

Trioxane was added to a Kokneader manufactured by Baker Perkins Inc. at a feed rate of 4,260 parts per hour. The monomer feed also contained 1.84 weight percent ethylene oxide based on the weight of trioxane and 401 ppm methylal based on the weight of trioxane. Boron trifluoride gas mixed with gaseous nitrogen in a volume ratio of 1:10 was introduced into the reactor through a 0.093 inch diameter tube mounted concentrically to the monomer feed nozzle. The tube was set so that it discharged catalyst about one-fourth inch from the surface of the reactor screw. The boron trifluoride catalyst was introduced at a rate of 31.1 ppm based on the weight of trioxane. As the reactants progressed through the reactor, the temperature varied from about 205° F. to about 221° F. with the temperature at the end of the reaction being 198° F. The residence time in the reactor was about 10 minutes. The polymeric product was then ground to a mean particle size of about 1 millimeter and the reaction was quenched in a quench tank containing water and triethylamine. The polymer was then stabilized in a melt hydrolysis process as described in U.S. Pat. No. 3,318,848 and 3,418,280. The percent conversion of trioxane to oxymethylene polymer was 58.7 percent.

EXAMPLE 2

This reaction was conducted in a Honda polymerization reactor. Trioxane was introduced at a feed rate of 4,260 parts per hour with ethylene oxide at a weight percent of 1.80 based on the weight of trioxane and methylal at a rate of 274 ppm based on the weight of trioxane. The boron trifluoride catalyst blended with nitrogen in a volume ratio of 1:10 was introduced at a feed rate of 65.7 ppm based on the weight of trioxane. The boron trifluoride/nitrogen mixture was introduced into the reactor through a 0.055 inch diameter tube positioned so that it discharged catalyst just at the nozzle of the monomer feed pipe. The temperature during the reaction varied from 207° F. to 215° F. with the exit temperature being 198° F. After grinding, quenching and stabilizing reactions, the polymer was recovered with a conversion of 58.7 percent.

Reaction conditions and percent conversion for a number of reactions are shown in Table I for the Baker, Perkins reactor and in Table II for the Honda reactor. Physical properties of plastic molds made from the product of those reactions listed in Tables I are shown in Table III. Vicat temperature is a measure of the heat distortion of the polymer. "b" Color is the color measured on a Hunter Colormeter. The lower the number the less yellow in the sample. Mxb color is the shift in "b" color after the sample is melted and molded. The lower numbers indicate less color shift.

The ethylene oxide distribution in the polymeric products is listed in Table IV. Ethylene oxide can copolymerize with trioxane to form one oxyethylene unit between two oxymethylene units. Such units are referred to in Table V as Mono (%). Ethylene oxide can also polymerize with itself as well as with the trioxane to form two or more oxyethylene units between two oxymethylene units. The polymeric forms are referred to in Table V as Di (%) and Tri (%).

TABLE I

| | Reaction Conditions | | | |
|---|---|---|---|---|
| Example | 1 | 3 | 5 | Control A |
| Trioxane Feedrate (Part/Hr) | 4260 | 3757 | 3244 | 4260 |
| Ethylene Oxide Feedrate (Wt %) | 1.84 | 1.82 | 1.65 | 1.76 |
| Methylal Feedrate (ppm) | 401 | 381 | 403 | 371 |
| $BF_3$:$N_2$ Vol | 1:10 | 1:30 | 1:10 | — |
| $BF_3$ Feedrate (ppm) | 31.1 | 29.3 | 20.7 | 41.9 |
| % Conversion | 58.7 | 54.4 | 52.5 | 53.9 |

TABLE II

| | Reaction Conditions | | | |
|---|---|---|---|---|
| Example | 2 | 4 | 6 | Control B |
| Trioxane Feedrate (Part/Hr) | 4260 | 2662 | 3346 | 4260 |
| Ethylene Oxide Feedrate (Wt %) | 1.80 | 1.86 | 1.71 | 1.72 |
| Methylal Feedrate (ppm) | 274 | 286 | 304 | 291 |
| $BF_3$:$N_2$ Vol | 1:10 | 1:30 | 1:30 | — |
| $BF_3$ Feedrate (ppm) | 65.7 | 63.8 | 52.5 | 65.8 |
| % Conversion | 58.7 | 54.4 | 52.5 | 53.9 |

TABLE III

| | Physical Properties | | | |
|---|---|---|---|---|
| Example | 1 | 3 | 5 | Control A |
| $K_d$ | 0.015 | 0.016 | 0.016 | 0.017 |
| Extractable HCHO | 0.082 | 0.077 | 0.066 | 0.066 |
| Vicat Temp °C. | 158.9 | 158.9 | 158.3 | 159.1 |
| b Color | 1.67 | 1.86 | 2.29 | 1.93 |
| Mxb Color | 15.7 | 13.3 | 6.8 | 19.9 |
| Tensile Strength (psi) | 8527.5 | 8515 | 8462 | 8435 |

TABLE III-continued

| | Physical Properties | | | |
|---|---|---|---|---|
| Example | 1 | 3 | 5 | Control A |
| Elongation at Break (%) | 64.5 | 61.7 | 69.0 | 80 |
| Flex Strength (psi) | 12106 | 11934 | 12027 | 11979 |
| Flex Modulus (psi × $10^6$) | 0.362 | 0.361 | 0.363 | 0.361 |
| Izod (Ft lbs/In) | 1.37 | 1.37 | 1.44 | 1.48 |

TABLE IV

| | Ethylene Oxide Distribution | | |
|---|---|---|---|
| Example | 1 | 5 | Control A |
| Ethylene Oxide in Feed (Wt %) | 1.82 | 1.68 | 1.77 |
| Ethylene Oxide in Polymer (Wt %) | 2.19 | 2.14 | 2.42 |
| As Mono (%) | 55.9 | 52.1 | 46.7 |
| As Di (%) | 33.1 | 35.7 | 38.0 |
| As Tri (%) | 11.0 | 12.3 | 15.3 |

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. In a process for producing oxymethylene polymers by continuously polymerizing in bulk a monomer mixture containing at least 85 weight percent trioxane in the presence of a boron trifluoride catalyst, the improvement which comprises introducing into the reactor containing a monomer mixture the boron trifluoride catalyst as a gas in admixture with gaseous nitrogen in the volume ratio of nitrogen to boron trifluoride of about 5:1 to about 40:1.

2. The process of claim 1 wherein the volume ratio of nitrogen to boron trifluoride is about 10:1 to about 30:1.

3. The process of claim 1 wherein the monomer mixture is a mixture of trioxane and a cyclic ether or cyclic acetal.

4. The process of claim 3 wherein the cyclic ether is ethylene oxide.

5. The process of claim 4 wherein the ethylene oxide is present in the weight percent of about 1 to about 5 based on the weight of the trioxane.

6. The process of claim 3 wherein the cyclic acetal is dioxolane.

7. The process of claim 6 wherein the dioxolane is present in the amount of about 1 to about 5 weight percent based on the weight of the trioxane.

8. The process of claim 1 wherein the boron trifluoride is present in the amount of about 20 to about 200 parts per million based on the weight of trioxane.

9. The process of claim 1 wherein the boron trifluoride is present in the amount of about 40 to about 120 parts per million based on the weight of the trioxane.

10. The process of claim 1 wherein the temperature of the reaction varies from about 190° F. to about 230° F.

* * * * *